Nov. 24, 1942.  V. EY  2,302,990
FLUID PRESSURE REGULATOR
Filed April 1, 1941    2 Sheets-Sheet 1

INVENTOR.
Victor Ey
BY Clark & Ott
ATTORNEYS

Nov. 24, 1942.   V. EY   2,302,990
FLUID PRESSURE REGULATOR
Filed April 1, 1941   2 Sheets-Sheet 2

INVENTOR.
Victor Ey
BY
Clark & Ott
ATTORNEYS

Patented Nov. 24, 1942

2,302,990

UNITED STATES PATENT OFFICE 2,302,990

FLUID PRESSURE REGULATOR

Victor Ey, New York, N. Y.

Application April 1, 1941, Serial No. 386,239

2 Claims. (Cl. 50—17)

This invention relates to fluid pressure regulators and particularly to those of the type for controlling the pressure of gaseous fluids, the invention being directed to means which is either incorporated in the regulator structure or constitutes an attachment therefor by virtue of which a predetermined outlet pressure is insured irrespective of the volume of fluid withdrawn from the regulator within the rated capacity thereof.

In the conventionalized types of pressure regulators embodying the spring or weight actuated diaphragm for controlling the valve, it has been observed that as the load increases, a decided drop in the outlet pressure results.

The present invention comprehends a device which may be incorporated in the regulator structure or employed as an attachment for existing regulators which is so constructed and arranged as to not only avoid a drop in the pressure of the fluid delivered from the regulator and thus insure a constant or predetermined outlet pressure, but which may be so designed as to actually effect an increase in pressure coincident with the increase in capacity if so desired.

As a further feature, the invention comprehends a device of the indicated character by virtue of which an increase in the capacity of a pressure regulator may be attained without increasing the size thereof which is a desirable feature particularly where installation space is limited.

With the above enumerated and other objects in view, the invention is set forth in greater detail in the following specification and illustrated in the accompanying drawings in which.

Figure 1:
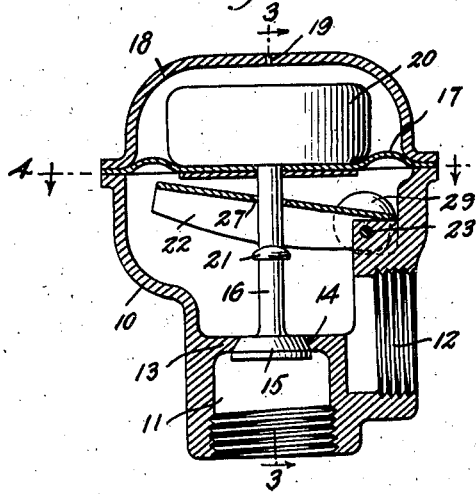
Fig. 1 is a vertical sectional view of a pressure regulator constructed in accordance with the invention and illustrating the valve in closed position.
Figure 3:
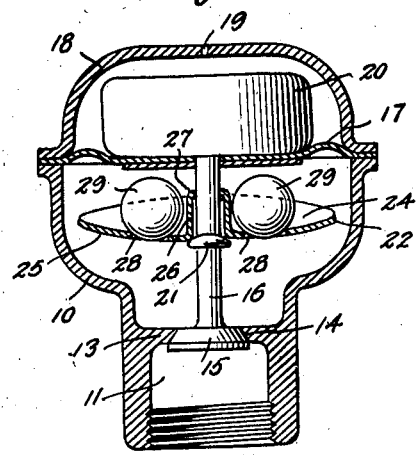
Fig. 3 is a vertical sectional view taken approximately on the line 3—3 of Fig. 1.

Referring to the drawings by characters of reference, and particularly to the form of the invention illustrated in Figs. 1 to 4 inclusive, 10 designates the regulator casing which is provided with an inlet port 11 and an outlet port 12 and which casing is subdivided by a partition 13 into a pair of chambers which communicate with each other through a passage 14 formed in the partition and defining a valve seat. The flow of fluid through the passage 14 is controlled by a valve 15 having an upstanding stem 16 which is connected with a diaphragm 17 secured between the confronting edges of the upper open end of the casing 10 and a cap 18 arranged thereover and provided with a vent 19.

The diaphragm, as illustrated, is provided on its upper side with a weight 20 cooperating therewith to urge the valve 15 downwardly, but it is to be understood that the regulator is not limited to the use of a weight actuated diaphragm as other equivalent types, such as spring operated diaphragms, fall within the purview of the invention.

As illustrated, the valve stem 16 is formed with a medial shoulder 21 upon which a pivoted disk 22 impinges and which disk is fulcrumed on a pivot pin 23 at one side of the casing. The pivoted disk 22 is dished providing a concave upper surface 24 and a convex lower surface 25 and is provided with a diametrically extending medial upwardly offset portion 26 formed with a central opening 27 through which the valve stem 16 extends. On opposite sides of and parallel to the portion 26, the disk is provided with slots 28 serving as raceways for guidedly supporting for rolling movement the spherical weights or balls 29.

Figure 2:
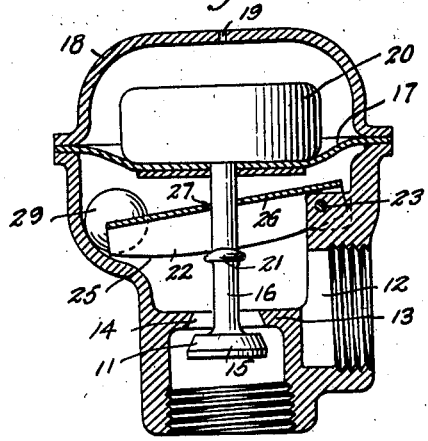
Fig. 2 is a similar view illustrating the valve in its fully opened position.
Figure 4:
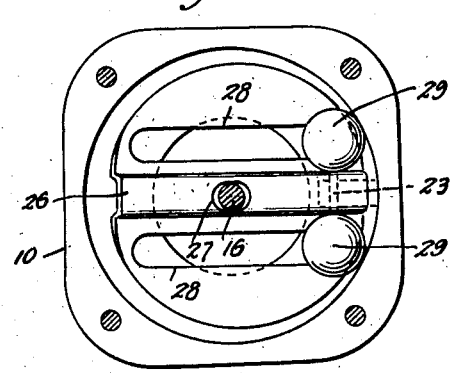
Fig. 4 is a horizontal sectional view taken approximately on line 4—4 of Fig. 1.
Figure 5:
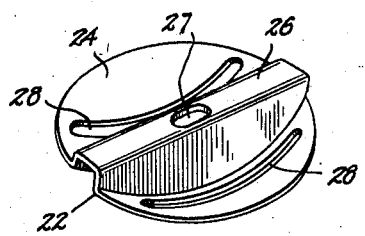
Fig. 5 is a detail perspective view of the auxiliary weight supporting guide.

In use and operation, when the valve element 15 is in closed seated relation to the passage 14, the disk 22 is inclined upwardly from its fulcrum or pivot pin 23 as illustrated in Fig. 1, and the balls or spherical weights 29 are disposed in substantially axial alignment with the pivot pin. As the fluid is withdrawn from the outlet 12 to decrease the pressure in the outlet chamber of the regulator casing, the weighted diaphragm 17 lowers the valve stem 16 to open the valve 15 with reference to the passage 14 causing the disk to swing downwardly with the movement of the stem as illustrated in Fig. 2. If the demand for fluid is not too great so that the downward movement of the valve stem and valve is relatively slight, the spherical weights 29 will not move an appreciable distance from the fulcrum 23. If, however, the volume of fluid withdrawn from the outlet appreciably increases, a drop in the pressure is avoided by a wider opening of the valve 15 due to the fact that the valve stem 16 moves downwardly a greater distance causing the spherical weights to roll a greater distance from the fulcrum 23 to augment the action of the weighted diaphragm 17 and to increase the leverage of the weight impinged on the disk. The curvature of the disk or spherical weight guides is such that the supplemental action of the spherical weights compensates for the increased demand for fluid at the outlet by effecting a wider opening of the valve 15 to maintain the pressure constant irrespective of the volume of the fluid flowing from the outlet within the rated capacity of the regulator. For instance, in a ¾ inch pipe size valve where the regulator is designed for 3 inch pressure at the outlet under this construction of regulator said pressure is maintained constant up to the rated capacity of 250 feet per hour.

Figure 6:
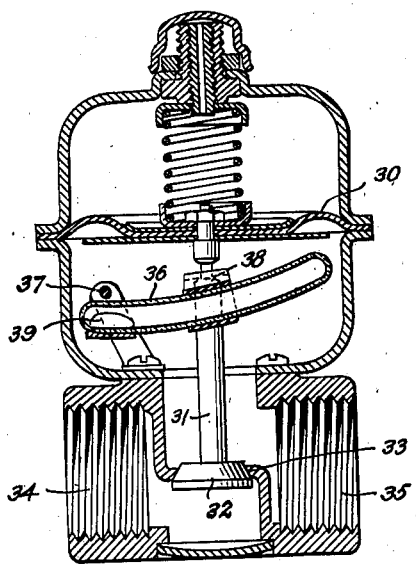
Fig. 6 is a vertical sectional view of a pressure regulator illustrating a modified form of the invention.

In the modified form of the invention illustrated in Fig. 6, the regulator includes a spring pressed diaphragm 30 connected with the stem 31 of a valve 32 which cooperates with the fluid passage 33 to control the flow of fluid from the inlet 34 to the outlet 35. In this form of the invention, the supplemental means for augmenting the action of the diaphragm consists of one or more arcuate upwardly curved vacuum tubes 36 which are pivoted on a fixed fulcrum 37 on one side of the valve stem and which have bearing upon a shoulder 38 on the valve stem. In this instance the rollable weight consists of a globule of mercury 39 which is freely movable in the tube and functions in the same manner as in the previous form to avoid pressure drop and maintain a constant pressure within the rated capacity of the regulator as the volume increases.

Figure 7:
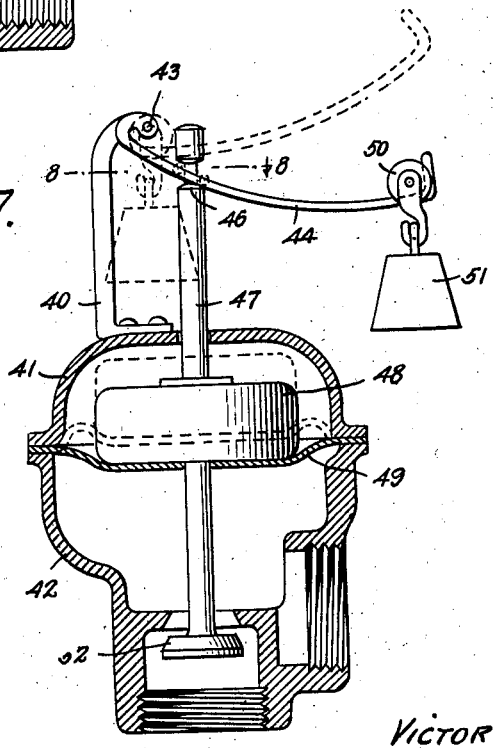
Fig. 7 is a similar view illustrating a further modification of the invention and showing the auxiliary weight control means as an attachment.
Figure 8:
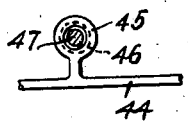
Fig. 8 is a fragmentary sectional plan view taken approximately on the line 8—8 of Fig. 7.

In the form of the invention illustrated in Figs. 7 and 8, a supplemental means is disclosed as an attachment and consists of a bracket 40 which is secured to the cap 41 of the regulator casing 42. The bracket has fulcrumed on a pivot 43 an upwardly curved arcuate arm 44 which is provided with a lateral apertured stem 45 engaging a shoulder 46 formed on an upstanding extension 47 connected to the weight 48 of the diaphragm 49. The arm has mounted for rolling movement longitudinally thereof, a sheave 50 supporting a depending weight 51. Under this construction and arrangement, the attachment functions in the manner of the previous forms to supplement the action of the weighted diaphragm 49 to control the valve 52 of the regulator.

Figure 9:
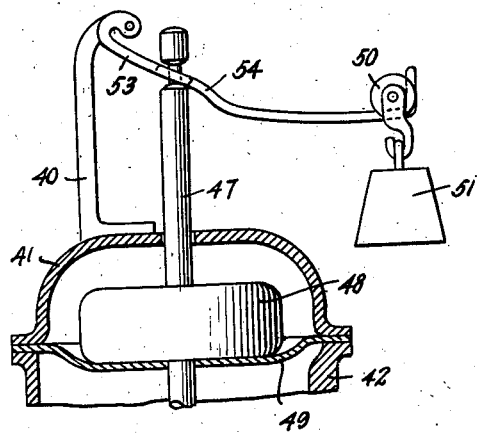
Fig. 9 is a fragmentary vertical sectional view illustrating a still further modification.

The form of the invention illustrated in Fig. 9 of the drawings is similar to the form shown in Figs. 7 and 8, but in this instance the weight supporting arm 53 is provided intermediate its ends with an offset portion 54 for varying the action of the weighted arm so as to deviate from the normal action of the device to either increase or decrease the pressure at a particular volume of flow of fluid from the regulator outlet.

What is claimed is:

1. In a gas pressure regulator provided with a diaphragm, a valve for controlling the flow of gas through the regulator and having a stem connecting said valve and diaphragm for conjoint movement thereof, and means opposed by the pressure of the gas on the diaphragm in the outlet side of the regulator for urging said diaphragm to move said valve to open relation, of means for progressively increasing the weight imposed on the diaphragm with the progressive increase in the volume of gas flowing from the outlet side of the regulator, said means including a hemispherical disk member pivoted adjacent one side thereof to swing in the direction of movement of the valve and having its concave surface disposed uppermost, a diametrically disposed upwardly offset inverted channel-shaped partition defining on opposite sides thereof a pair of longitudinally concaved guideways extending from one side thereof adjacent said pivotal connection to the opposite side of said member, a pair of weights rollable in said guideways respectively disposed at opposite sides of the channel-shaped partition, and means carried by said stem for supporting said member intermediate thereof between said guideways for imposing said weights upon the diaphragm when the valve is opened for augmenting the opening of said valve as the volume of gas flowing from the outlet side of the regulator increases.

2. In a gas pressure regulator provided with a diaphragm, a valve for controlling the flow of gas through the regulator and having a stem connecting said valve and diaphragm for conjoint movement thereof, and means opposed by the pressure of the gas on the diaphragm in the outlet side of the regulator for urging said diaphragm to move said valve to open relation, of means for progressively increasing the weight imposed on the diaphragm with the progressive increase in the volume of gas flowing from the outlet side of the regulator, said means including a hemispherical dish-shaped member pivoted at one side to swing in the direction of movement of the valve and having an upwardly extending medial inverted channel-shaped portion formed with an opening and a concaved upper surface on each side of said medial portion, a pair of rollable weights carried by said member adapted to gravitationally roll on said concave surfaces on opposite sides of said medial portion respectively as the said dished-shaped member is swung to dispose any portion of said concave upper surface in a declining relation away from said pivotal connection, and means carried by said stem for supporting said dished-shaped member intermediate thereof with the stem extending through the opening in said upwardly extending medial portion to impose said rollable weights on the diaphragm when the valve is opened for augmenting the opening thereof as the volume of gas flowing from the outlet side of the regulator increases.

VICTOR EY.